US012404476B2

(12) United States Patent
Amador Zamarreno et al.

(10) Patent No.: US 12,404,476 B2
(45) Date of Patent: Sep. 2, 2025

(54) METHOD OF LAUNDERING FABRIC

(71) Applicant: The Procter & Gamble Company, Cincinnati, OH (US)

(72) Inventors: Carlos Amador Zamarreno, Newcastle upon Tyne (GB); Anju Deepali Massey Brooker, Newcastle upon Tyne (GB); Laura Bueno Romo, Newcastle upon Tyne (GB); Andre Chieffi, Tynemouth (GB); Andrew Philip Moon, South Shields (GB)

(73) Assignee: The Procter & Gamble Company, Cincinnati, OH (US)

( * ) Notice: Subject to any disclaimer, the term of this patent is extended or adjusted under 35 U.S.C. 154(b) by 593 days.

(21) Appl. No.: 17/714,172

(22) Filed: Apr. 6, 2022

(65) Prior Publication Data

US 2022/0228090 A1 Jul. 21, 2022

Related U.S. Application Data

(63) Continuation of application No. PCT/US2020/070624, filed on Oct. 7, 2020.

(30) Foreign Application Priority Data

Oct. 8, 2019 (EP) .................................... 19202072

(51) Int. Cl.

*C11D 3/00* (2006.01)
*C11D 3/386* (2006.01)
*C11D 3/395* (2006.01)
*C11D 3/42* (2006.01)
*C11D 3/50* (2006.01)
*D06L 1/08* (2006.01)

(52) U.S. Cl.

CPC ............ *C11D 3/0063* (2013.01); *C11D 3/001* (2013.01); *C11D 3/3951* (2013.01); *C11D 3/42* (2013.01); *C11D 3/505* (2013.01); *D06L 1/08* (2013.01); *C11D 2111/12* (2024.01); *C11D 2111/44* (2024.01)

(58) Field of Classification Search

None

See application file for complete search history.

(56) References Cited

U.S. PATENT DOCUMENTS 3,927,967 A 12/1975 Speakman
4,166,718 A * 9/1979 Reinert .................... C11D 3/40 8/111
4,332,691 A * 6/1982 Beavan ..................... D06L 4/24 510/303
4,668,418 A 5/1987 Ricchiero
5,979,472 A 11/1999 Lowery et al.
6,339,055 B1 1/2002 Brooker et al.
6,583,105 B1 6/2003 Hoehener et al.
7,018,977 B2 3/2006 Martens
7,604,012 B2 10/2009 Alpert et al.
7,897,104 B2 3/2011 Kwon
8,047,683 B2 11/2011 Olesen et al.
8,461,095 B2 6/2013 Torres
9,464,375 B2 10/2016 Willey et al.
9,834,740 B2 12/2017 Willey et al.
10,098,519 B2 10/2018 Willey et al.
11,173,077 B2 11/2021 Erdem et al.
11,285,056 B2 3/2022 Erdem et al.
2002/0122743 A1 9/2002 Huang
2004/0266648 A1 12/2004 Willey
2005/0288200 A1 12/2005 Willey et al.
2006/0079438 A1* 4/2006 Brush ...................... C11D 1/62 510/516
2010/0200026 A1 8/2010 Boztas et al.
2010/0216679 A1 8/2010 Batchelor et al.
2010/0234259 A1 9/2010 Batchelor
2011/0044848 A1 2/2011 Wright
2011/0057123 A1 3/2011 Ho
2014/0364353 A1 12/2014 Patterson
2015/0208898 A1* 7/2015 Willey ...................... B08B 3/10 422/186
2015/0209808 A1 7/2015 Watson
2015/0210964 A1 7/2015 Willey et al.
2018/0320109 A1 11/2018 Boutique et al.
2019/0136440 A1 5/2019 Clarke
2021/0087738 A1* 3/2021 Chieffi ..................... C11D 3/24
2022/0228091 A1 7/2022 Amador Zamarreno et al.
(Continued)

FOREIGN PATENT DOCUMENTS

CN 1061619 A 6/1992
CN 1409754 A 4/2003
(Continued)

OTHER PUBLICATIONS

All Office Actions; U.S. Appl. No. 17/714,173, filed Apr. 6, 2022.
(Continued)

*Primary Examiner* — Lorna M Douyon

(74) *Attorney, Agent, or Firm* — George H. Leal; Andrew J. Mueller

(57) ABSTRACT

A method of laundering fabric, where the method includes the steps of:

(a) in a main washing step, washing soiled fabric with an aqueous wash bath including detersive surfactant and photo-bleach; and (b) in a rinsing step, rinsing the soiled fabric with an aqueous rinsing solution including perfume, where an artificial light source is present and turned on during at least part of the main washing step (a) and provides light to the wash liquor in such a manner that activates the photo-bleach present in the wash liquor, and where the artificial light source is turned off during at least part of the rinsing step (b) and does not provide any light to the aqueous rinsing solution.

9 Claims, No Drawings

(56) References Cited

FOREIGN PATENT DOCUMENTS

| | | | |
|---|---|---|---|
| CN | 101501173 | A | 8/2009 |
| CN | 105087183 | A | 11/2015 |
| EP | 3444328 | A1 | 2/2019 |
| GB | 1372035 | A | 10/1974 |
| GB | 1372036 | A | 10/1974 |
| JP | S5792095 | A | 6/1982 |
| JP | 2011224208 | A | 11/2011 |
| WO | 01007549 | A1 | 2/2001 |
| WO | 02036722 | A1 | 5/2002 |
| WO | 2006002363 | A1 | 1/2006 |
| WO | 2007087259 | A2 | 8/2007 |
| WO | 2008065062 | A1 | 6/2008 |
| WO | 2008128817 | A1 | 10/2008 |
| WO | 2009040175 | A1 | 4/2009 |
| WO | 2009148801 | A1 | 12/2009 |
| WO | 2010051808 | A2 | 5/2010 |
| WO | 2010099997 | A1 | 9/2010 |
| WO | 2013188331 | A1 | 12/2013 |
| WO | 2015112684 | A1 | 7/2015 |
| WO | 2016028599 | A1 | 2/2016 |

OTHER PUBLICATIONS

PCT Search Report and Written Opinion for PCT/US2020/070624 dated Feb. 10, 2021, 8 pages.

Extended European Search Report and Search Opinion; Application No. 19202072.5; dated Mar. 31, 2020; 06 pages.

* cited by examiner

METHOD OF LAUNDERING FABRIC

FIELD OF THE INVENTION

The present disclosure relates to a method of laundering fabric using a photo-bleach and an artificial light source. The method is a laundering process that provides good cleaning performance, especially for soils that cause malodor.

BACKGROUND OF THE INVENTION

The benefits of using photoactive components within a laundry treatment composition have been described in prior art, for instance, improvement to stain removal or elimination of micro-organisms such as bacteria and spores.

A problem in the prior art is an effective and uniform activation of the photoactive component within the wash solvent (e.g. water). When an activating light source is provided as a fixed arrangement within the washing machine, it will only activate the photoactive component in the vicinity of the fixed source, meaning that the laundry articles and the wash solvent (e.g. water) need to be thoroughly agitated in order to ensure a uniform exposure from the light source.

A further problem of the art is to protect detergent components such as perfumes, hueing dyes, brighteners and enzymes from oxidative degradation by the light activated photocatalyst.

SUMMARY OF THE INVENTION

The present invention provides a method of laundering fabric, wherein the method comprises the steps of:

(a) in a main washing step, washing soiled fabric with an aqueous wash bath comprising detersive surfactant and photo-bleach; and (b) in a rinsing step, rinsing the soiled fabric with an aqueous rinsing solution comprising one or more of the following components: perfume, brighteners, hueing dyes, enzymes, and any combination thereof wherein an artificial light source is present and turned on during at least part of the main washing step (a) and provides light to the wash liquor in such a manner that activates the photo-bleach present in the wash liquor, and wherein the artificial light source is turned off during at least part of the rinsing step (b) and does not provide any light to the aqueous rinsing solution.

DETAILED DESCRIPTION OF THE INVENTION

The Method of Laundering Fabric

The method of laundering fabric comprises the steps of:

(a) in a main washing step, washing soiled fabric with an aqueous wash bath comprising detersive surfactant and photo-bleach; and (b) in a rinsing step, rinsing the soiled fabric with an aqueous rinsing solution comprising one or more of the following components: perfume, brighteners, hueing dyes, enzymes and any combination thereof.

wherein an artificial light source is present and turned on during at least part of the main washing step (a) and provides light to the wash liquor in such a manner that activates the photo-bleach present in the wash liquor, and wherein the artificial light source is turned off during at least part of the rinsing step (b) and does not provide any light to the aqueous rinsing solution.

Typically, the method is carried out in an automatic washing machine. Typically, the artificial light source is a light source present in the washing drum of the automatic washing machine.

The method can be used to provide whiteness and freshness benefits to a laundered fabric.

Step (a), Main Washing Step

In the main washing step, step (a), soiled fabric is washed with an aqueous wash bath comprising detersive surfactant and photo-bleach.

An artificial light source is present and turned on during at least part of the main washing step (a) and provides light to the wash liquor in such a manner that activates the photo-bleach present in the wash liquor. It may be preferred for the artificial light source to be turned on for the majority of the main washing step (a). It may even be preferred for the artificial light source to be turned on for the entire main washing step (a).

Step (b), Rinsing Step

In the rinsing step, step (b), the soiled fabric is rinsed with an aqueous rinsing solution comprising one or more of the following components: perfume, brighteners, hueing dyes, enzymes and any combination thereof.

The artificial light source is turned off during at least part of the rinsing step (b) and does not provide any light to the aqueous rinsing solution. Preferably, the artificial light source is turned off for the majority of the rinsing step (b). It may even be preferred for the artificial light source to be turned off for the entire rinsing step (b).

Photobleach

The photo-bleach typically comprises a photoactive moiety selected from the group consisting of xanthone, xanthene, thioxanthone, thioxanthene, phenothiazine, fluorescein, benzophenone, alloxazine, isoalloxazine, flavin, phthalocyanine, derivatives thereof, and any combination thereof. Preferably the photobleach is selected from: riboflavin; phloxine B; erythrosine; salts of any of these photobleach; derivatives of any of these photobleach; and any combination thereof.

It may be preferred that:

(a) the photo-bleach is thioxanthone, and wherein the artificial light source provides light having a wavelength of from 300 nm to 400 nm;

(b) the photo-bleach is riboflavin, and wherein the artificial light source provides light having a wavelength of from 400 nm to 480 nm;

(c) the photo-bleach is phloxine B, and wherein the artificial light source provides light having a wavelength of from 460 nm to 570 nm;

(d) the photo-bleach is erythrosine, and wherein the artificial light source provides light having a wavelength of from 460 nm to 550 nm; and/or (e) the photo-bleach is phthalocyanine derivative, and wherein the artificial light source provides light having a wavelength of from 550 nm to 750 nm.

Aqueous Wash Bath

The aqueous wash bath is typically formed by contacting a laundry detergent to water. The laundry detergent typically comprises detersive surfactant and photobleach.

Rinsing Solution

The rinsing solution may comprise perfume. It may be preferred for the rinsing solution to comprise other chemistry that is not compatible with the photobleach, for example chemistry that may not be stable in the presence of photobleach. Such chemistry may include enzymes, hueing dye and/or brightener.

In addition, the rinsing solution may comprise chemistry that provides benefits to the fabric during the rinsing step. Such chemistry may include a fabric softener.

The rinsing solution may comprise a hueing dye. The rinsing solution comprises a brightener. The rinsing solution comprising a fabric-softener.

The rinsing solution is typically formed by contacting a fabric enhancer to water. The fabric enhancer typically comprises perfume.

Artificial Light Source

Typically, the artificial light source is present in the washing drum of the automatic washing machine. Preferably the artificial light source is provided by one or more LEDs, or two or more LEDs, or three or more LEDs, or even for four or more LEDs. Preferably the artificial light source is provided by one or more bulbs, or two or more bulbs, or three or more bulbs, or even for four or more bulbs.

Typically, the artificial light source is present and turned on during at least part of the main washing step (a) and provides light to the wash liquor in such a manner that activates the photo-bleach present in the wash liquor. The artificial light is preferably turned on for the majority of the duration of the main washing step (a), the artificial light may be turned on for the entirety of the main washing step (a).

The artificial light source is turned off during at least part of the rinsing step (b) and does not provide any light to the aqueous rinsing solution during this time. The artificial light source may be turned off for the majority of the duration of the rinsing step (b), the artificial light source may be turned off for the entirety of the rinsing step (b) and does not provide any light to the aqueous rinsing solution during this time.

By majority of time, it is meant for more than 50%, or even more than 60%, or even more than 70%, or even more than 80%, or even more than 90% of the time of the step.

The artificial light source may comprise two or more, or three or more, or even four or more, LEDs.

It may be preferred that the artificial light source emits diffused light.

A diffused light is defined as a light with a beam spread from 46° to 130° or higher, which corresponds to beam type from 4 to 7 according to the NEMA (National Electrical Manufacturers Association) beam spread classification (c.f. table 4).

TABLE 4

NEMA Beam Spread Classification
NEMA Beam Spread Classifications

| Beam Spread (°) | NEMA Type | Beam Description | Beam Projection Distance |
|---|---|---|---|
| 10° to 18° | 1 | Very Narrow | 240 ft and greater |
| 18° to 29° | 2 | Narrow | 200 to 240 ft |
| 29° to 46° | 3 | Medium Narrow | 175 to 200 ft |
| 46° to 70° | 4 | Medium | 145 to 175 ft |
| 70° to 100° | 5 | Medium Wide | 105 to 145 ft |
| 100° to 130° | 6 | Wide | 80 to 105 ft |
| 130° and up | 7 | Very Wide | Under 80 ft |

Laundry Detergent

The aqueous wash liquor used in the present invention may contain one or more detersive surfactants, typically including but not limited to: anionic surfactants, nonionic surfactants, cationic surfactants, zwitterionic surfactants, amphoteric surfactants, and combinations thereof. Useful anionic surfactants for the practice of the present invention can themselves be of several different types. For example, water-soluble salts of the higher fatty acids, i.e., "soaps", are useful anionic surfactants in the aqueous wash liquor herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Additional non-soap anionic surfactants which are suitable for use herein include the water-soluble salts, preferably the alkali metal, and ammonium salts, of organic sulfuric reaction products having in their molecular structure an alkyl group (included in the term "alkyl" is the alkyl portion of acyl groups) containing from about 10 to about 20 carbon atoms and a sulfonic acid or sulfuric acid ester group. Examples of this group of synthetic anionic surfactants include, but are not limited to: a) the sodium, potassium and ammonium alkyl sulfates with either linear or branched carbon chains, especially those obtained by sulfating the higher alcohols ($C_{10}$-$C_{20}$ carbon atoms), such as those produced by reducing the glycerides of tallow or coconut oil; b) the sodium, potassium and ammonium alkylethoxy sulfates with either linear or branched carbon chains, particularly those in which the alkyl group contains from about 10 to about 20, preferably from about 12 to about 18 carbon atoms, and wherein the ethoxylated chain has, in average, a degree of ethoxylation ranging from about 0.1 to about 5, preferably from about 0.3 to about 4, and more preferably from about 0.5 to about 3; c) the sodium and potassium alkyl benzene sulfonates in which the alkyl group contains from about 10 to about 20 carbon atoms in either a linear or a branched carbon chain configuration, preferably a linear carbon chain configuration; d) the sodium, potassium and ammonium alkyl sulphonates in which the alkyl group contains from about 10 to about 20 carbon atoms in either a linear or a branched configuration; e) the sodium, potassium and ammonium alkyl phosphates or phosphonates in which the alkyl group contains from about 10 to about 20 carbon atoms in either a linear or a branched configuration; and f) the sodium, potassium and ammonium alkyl carboxylates in which the alkyl group contains from about 10 to about 20 carbon atoms in either a linear or a branched configuration, and combinations thereof. Especially preferred for the practice of the present invention are surfactant systems containing C10-C20 linear alkyl benzene sulphonates (LAS) and C10-C20 linear or branched unalkoxylated alkyl sulfates (AS). Preferred for the practice of the present invention are LAS surfactants, as described hereinabove. The LAS can be present in either the pre-treatment composition or the subsequently added fabric treatment composition in an amount sufficient to form an aqueous wash liquor containing from about 100 ppm to about 2000 ppm, preferably from about 200 ppm to about 1500 ppm, more preferably from about 300 ppm to about 1000 ppm, of LAS.

The aqueous wash liquor may comprise (either as an alternative to LAS or in combination with LAS) one or more AS surfactants, as described hereinabove. The AS surfactant(s) can be present in the aqueous wash liquor at an amount ranging from about 100 ppm to about 2000 ppm, preferably from about 200 ppm to about 1500 ppm, more preferably from about 300 ppm to about 1000 ppm.

The aqueous wash liquor may further comprise one or more C10-C20 linear or branched alkylalkoxylated sulfates (AAS) having an average degree of ethoxylation ranging from about 0.1 to about 5, preferably from about 0.3 to about 4 and more preferably from about 0.5 to about 3. Such AES surfactants can be present therein at an amount ranging from about 0 ppm to about 1000 ppm, preferably from about 0 ppm to about 500 ppm, more preferably from about 0 ppm to about 300 ppm.

Further, the aqueous wash liquor may contain from about 0 ppm to about 1000 ppm, preferably from about 0 ppm to about 500 ppm, more preferably from about 0 ppm to about 200 ppm, of a nonionic surfactant. Preferred nonionic surfactants are those of the formula $R^1(OC_2H_4)_nOH$, wherein $R_1$ is a $C_{10}$-$C_{20}$ alkyl group or alkyl phenyl group, and n is from about 1 to about 80. Particularly preferred are $C_{10}$-$C_{20}$ alkylalkoxylated alcohols (AA) having an average degree of alkoxylation from 1 to 20.

Other surfactants useful herein include amphoteric surfactants and cationic surfactants. Such surfactants are well known for use in laundry detergents and are typically present at levels from about 10 ppm to about 300 ppm, preferably from about 15 ppm to about 200 ppm, more preferably from about 20 ppm to about 100 ppm.

The aqueous wash liquor of the invention may also contain one or more adjunct ingredients commonly used for formulating laundry detergent compositions, such as builders, fillers, carriers, structurants or thickeners, clay soil removal/anti-redeposition agents, polymeric soil release agents, polymeric dispersing agents, polymeric grease cleaning agents, enzymes, enzyme stabilizing systems, amines, bleaching compounds, bleaching agents, bleach activators, bleach catalysts, brighteners, dyes, hueing agents, dye transfer inhibiting agents, chelating agents, softeners or conditioners (such as cationic polymers or silicones), perfumes (including perfume encapsulates), hygiene and malodor treatment agents, and the like. Preferably, the aqueous wash liquor of the present invention is substantially free of any fabric softening agent.

Aqueous Rinsing Solution

The aqueous rinsing solution comprises one or more of the following components: perfume, brighteners, hueing dyes, enzymes and any combination thereof.

The rinsing solution of the present invention may consist essentially of water, either deionized water or tap water. The rinsing solution may comprise one or more fabric care agents selected from the group consisting of fabric softening agents, surface modifiers, anti-wrinkle agents, perfumes, and the like. For example, the aqueous rinsing solution of the present invention may comprise a fabric softening agent at an amount ranging from about 10 ppm to about 2000 ppm, preferably from about 20 ppm to about 1500 ppm, more preferably from about 50 ppm to about 1000 ppm. Preferably, the fabric softening agent is a cationic compound, such as quaternary ammonium compounds, a cationic silicone, cationic starch, smectite clay, and combinations or derivatives thereof. More preferably, it is a diester quaternary ammonium compound of formula (I):

{R4-*m*-N+—[(CH2)*n*-Y—R5]*m*}A- (I)

wherein each R is independently selected from the group consisting of hydrogen, a short chain C1-C6, poly(C2-C3 alkoxy), benzyl, and mixtures thereof; m is 2 or 3; each n is independently from 1 to 4; each Y is independently —O—(O)C— or —C(O)—O—; the sum of carbons in each R5 is C11-C21, with each R5 independently being a hydrocarbyl or substituted hydrocarbyl group; and A− is a softener-compatible anion.

Preferably, in formula (I), each R is independently selected from a C1-C3 alkyl; m is 2; each n is independently from 1 to 2; each is independently —O—(O)C— or —C(O)—O—; the sum of carbons in each R5 is C12-C20, with each R5 independently being a hydrocarbyl or substituted hydrocarbyl group; and A− is selected from chloride, bromide, methylsulfate, ethylsulfate, sulfate, or nitrate. More preferably, the fabric softening agent is a bis-(2-hydroxyethyl)-dimethylammonium chloride fatty acid ester, preferably having an average chain length of the fatty acid moieties of from 16 to 20 carbon atoms, preferably from 16 to 18 carbon atoms. Alternatively, the fabric softening agent can be a cationic silicone, such as polydimethylsiloxane polymers comprising at least one quaternized nitrogen atom.

The aqueous rinsing solution herein may comprise other materials, non-limiting examples of which include surfactants, solvents, salts (e.g., CaCl2), acids (e.g., HCl and formic acid), preservatives, and water. Preferably, the aqueous rinse liquor of the present invention is substantially free of the anionic and nonionic surfactants described hereinabove for the aqueous wash liquor, and more preferably it is substantially free of any surfactants.

EXAMPLES

All experiments were conducted using 5 cm×5 cm knitted cotton swatches (Warwick Equest, Ltd.). Prior to conduct the washing experiment, each knitted cotton swatch was pretreated with skatole. For that purpose, a solution was prepared by adding the required amount of skatole to isopropanol to achieve a concentration of 0.0025 g/mL. Next, a 10 mL aliquot of this solution was added to each knitted cotton swatch (the swatches were used within 10 min from the skatole addition).

All washing experiments were conducted by introducing 6 knitted cotton swatches pre-treated with skatole in a glass jar containing 50 mL of wash liquor. The wash liquor had been prepared by dissolving 3 g of the required liquid detergent formulation (formulation A or B described in Table 1) in 1.5 L of city water.

In the comparative wash process (experiment 1 and 2 in Table 2), the jar was placed inside a light box for 40 min with the light off and manually agitated every 2 minutes. Afterwards, a 10 mL aliquot was taken from the jar and the rest of the wash liquor was discarded while the knitted cotton swatches were left inside the jar. Next, 40 mL of city water, the 10 mL aliquot previously taken and the required volume of perfume solution to achieve a concentration of 12.5 ppm were added to the jar containing the knitted cotton swatches in order to mimic the rinsing stage of the washing cycle. The 10 mL aliquot was added back to the jar to replicate the detergent carry over from the main wash into the rinsing stage that occurs in a washing machine. Next, the jar was introduced once more into the light box for 30 minutes with the light off and manually agitated (by gently shaking the flask 5 times in a clockwise rotation) every 2 minutes. Finally, 4 mL of the wash liquor were transferred to GCMS (Gas Chromatography Mass Spectrometry) vials to assess the headspace. Two comparative wash processes were conducted using the experimental procedure previously described using composition A and composition B of the detergent formulation described in Table 1 respectively.

TABLE 1

| Group | Component | Composition A, ppm | Composition B, ppm |
|---|---|---|---|
| Surfactants | Sodium dodecyl benzenesulfonate (LAS) | 357 | 357 |
| | C14-15 AA with 7EO | 202 | 202 |
| | C12-14 AES with 3 EO (70%) | 220 | 220 |
| | Lauramine oxide | 19 | 19 |
| Builders/ Chelant | Fatty Acids | 121 | 121 |
| | Citric Acid | 156 | 156 |
| | Diethylene triamine penta(methyl phosphonic acid) (DTPMP) | 18 | 18 |
| Performance actives/ preservatives | Polymer Lutensit Z96 | 25 | 25 |
| | Polyethylene glycol (PEG)-co-polyvinyl acetate (PvAc) | 51 | 51 |
| | Brighteners | 4 | 4 |
| | Preservatives | 0.1 | 0.1 |
| Enzymes/ stabilisers | Protease | 2 | 2 |
| | Na Formate (40% solution) | 52 | 52 |
| Solvent/ neutralizer/ structurant | Ethanol | 19 | 19 |
| | 1,2 Propylene glycol | 190 | 190 |
| | NaOH | 204 | 204 |
| | MEA hydrogenated castor oil | 15 | 15 |
| Photocatalyst | Thioxanthone | 0 | 10 |

The same experimental procedure previously described for the comparative wash process was followed for the wash process (experiments 3-6 in Table 2) but in this case the light was turned on during the main wash and/or the rinsing stage as described in Table 2. Each of the wash processes was conducted using the detergent formulation with composition A or composition B described in Table 1.

TABLE 2

| Experiment | Light in the wash | Light in the rinse | Detergent composition (Table 1) |
|---|---|---|---|
| 1 | No | No | A |
| 2 | No | No | B |
| 3 | Yes | Yes | A |
| 4 | Yes | Yes | B |
| 5 | Yes | No | A |
| 6 | Yes | No | B |

Table 3 shows the headspace level for both perfume and malodor expressed as the percentage of headspace remaining after the washing cycle. It can be observed that in the comparative wash process (experiments 1 and 2) there is nil malodor reduction after washing the textiles regardless of the detergent composition used.

It can be observed that while experiments 4 and 6 exhibit the best malodor reduction benefits (traces after wash), having the light off during the rinse also provides the best perfume performance (experiment 6).

TABLE 3

| Experiment | Perfume on Headspace, % | Malodor on Headspace, % |
|---|---|---|
| 1 | 100 | 100 |
| 2 | 116 | 112 |
| 3 | 98 | 71 |
| 4 | 80 | Traces |
| 5 | 112 | 43 |
| 6 (inventive) | 95 | Traces |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

“about 40 mm”.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of laundering fabric, wherein the method comprises the steps of:

(a) in a main washing step, washing soiled fabric with an aqueous wash bath comprising detersive surfactant and photo-bleach; and (b) in a rinsing step, rinsing the soiled fabric with an aqueous rinsing solution comprising perfume and optionally one or more of the following components: brighteners, hueing dyes, enzymes and any combination thereof, wherein an artificial light source is present and turned on during the main washing step (a) and provides light to the wash liquor in such a manner that activates the photo-bleach present in the wash liquor, and wherein the artificial light source is turned off during the rinsing step (b) and does not provide any light to the aqueous rinsing solution.

2. A method according to claim 1, wherein the method is carried out in an automatic washing machine, and the artificial light source is a light bulb present in the washing drum of the automatic washing machine.

3. A method according to claim 1, wherein the photo-bleach is selected from the group consisting of; riboflavin; phloxine B; erythrosine; salts of any of these photobleach; derivatives of any of these photobleach; and any combination thereof.

4. A method according to claim 1, wherein:

(a) the photo-bleach is thioxanthone, and wherein the artificial light source provides light having a wavelength of from about 300 nm to about 400 nm;

(b) the photo-bleach is riboflavin, and wherein the artificial light source provides light having a wavelength of from about 400 nm to about 480 nm;

(c) the photo-bleach is phloxine B, and wherein the artificial light source provides light having a wavelength of from about 460 nm to about 570 nm;

(d) the photo-bleach is erythrosine, and wherein the artificial light source provides light having a wavelength of from about 460 nm to about 550 nm; and/or (e) the photo-bleach is phtalocyanine derivative, and wherein the artificial light source provides light having a wavelength of from about 550 nm to about 750 nm.

5. A method according to claim 1, wherein the rinsing solution comprises a hueing dye.

6. A method according to claim 1, wherein the rinsing solution comprises a brightener.

7. A method according to claim 1, wherein the rinsing solution comprising a fabric-softener.

8. A method according to claim 1, wherein the artificial light source comprises two or more bulbs.

9. A method according to claim 1, wherein the artificial light source emits diffused light.

* * * * *